Oct. 13, 1970   R. J. ALLDS ET AL   3,533,311
METHOD OF MAKING A CUTTER FOR A TRENCHING DEVICE
Filed July 1, 1968   5 Sheets-Sheet 1

INVENTORS,
RAYMOND J. ALLDS &
RICHARD C. REINKER
BY
Fay, Sharpe & Mulholland
ATTORNEYS Oct. 13, 1970   R. J. ALLDS ET AL   3,533,311
METHOD OF MAKING A CUTTER FOR A TRENCHING DEVICE
Filed July 1, 1968   5 Sheets-Sheet 2

INVENTORS,
RAYMOND J. ALLDS &
RICHARD C. REINKER
BY
Fay, Sharpe & Mulholland
ATTORNEYS Oct. 13, 1970  R. J. ALLDS ET AL  3,533,311
METHOD OF MAKING A CUTTER FOR A TRENCHING DEVICE
Filed July 1, 1968  5 Sheets-Sheet 3

INVENTORS,
RAYMOND J. ALLDS &
RICHARD C. REINKER
BY
Fay, Sharpe & Mulholland
ATTORNEYS INVENTORS,
RAYMOND J. ALLDS &
RICHARD C. REINKER
BY
*Fay, Sharpe & Mulholland*
ATTORNEYS United States Patent Office 3,533,311
Patented Oct. 13, 1970

3,533,311
METHOD OF MAKING A CUTTER FOR A
TRENCHING DEVICE
Raymond J. Allds and Richard C. Reinker, Ashtabula,
Ohio, assignors to Ashtabula Bow Socket Company,
Ashtabula, Ohio, a corporation of Ohio
Filed July 1, 1968, Ser. No. 741,674
Int. Cl. B21k 21/00
U.S. Cl. 76—101
4 Claims

ABSTRACT OF THE DISCLOSURE

This invention relates to power driven devices for digging trenches in soil. It includes a cutter having a general T shape with the cross piece of the T being the cutting edge and bucket for cutting and withdrawing soil from the trench. The tongue portion of the T being the means for mounting the cutter on a cutter support assembly attached to a driven endless digger chain. The cutter is sharpened at the front or top portion of the T and has at least one integral V-shaped deformity interrupting the sharpened face. The tongue shaped portion of the T includes a hole therethrough to serve as a tool engagement to force the tongue into a mounting pocket on the cutter support assembly. The tongue of the cutter also includes a button like projection for retaining the cutter within the pocket once it is assembled with the cutter support assembly. In addition, the invention involves the method of making the cutter which includes the steps of cutting the T-shaped blank, making a hole through the tongue portion of the T and forming the button thereon, forming a V-shaped tooth in the cross piece of the T, forming a sharp cutting edge on the cutting surface and bending the cross piece and a part of the tongue to form a concave surface having an axis substantially parallel to the tongue.

BACKGROUND OF THE INVENTION

Various forms of endless chain, multi-bucket trench excavators have been known in the art for many years. Integral buckets and cutters have been designed in all manner of shapes and sizes. The usual trench digger is a plurality of cutters assembled on an endless chain and requires continual maintenance to keep the trenching operation going. The labor costs for such maintenance are such that the cutter and the mounting assembly must be quickly replaceable should one be broken or excessively worn. Obviously, the cutter and the assembly devices must be simple and sturdy.

Many of the prior art devices for trenching have included welded, multipiece cutters and cast cutters. The cutter of the instant invention is stronger, more reliable, and less expensive to manufacture because it is made by a forging process from a unitary piece of steel. Unitary forged construction is less expensive and precludes failures due to defective weldments or castings.

BRIEF DESCRIPTION OF THE INVENTION

This invention is of three phases. A cutter, a trench digging apparatus including the cutter and the method of making the cutter.

The cutter is a generally T-shaped forging having a cross piece and a tongue portion. The tongue portion has an opening therethrough and a dimple formed in one face with a resulting button protuberance projecting from the opposite face. The hole is for engagement by a tool for forcing the tonque shaped portion into proper assembled position with the cutter support and the button projection is for snapping in place behind a strap of the support to retain the cutter in assembled position after it has been properly inserted. The cutting edge comprises a bevelled cutting surface. The cross piece of the T-shaped cutter may include at least two distinct cross-sections. It may include two substantially V-shaped teeth deformed out of the cross piece with the teeth terminating at the forward cutting edge and with the depth of the V decreasing away from the cutting edge. In the alternative the cross piece may have only one V-shaped tooth and two lateral teeth. The lateral teeth being the deflected end portions of the cross piece, one on each side of the V-shaped tooth.

To provide for a greater carrying capacity by the cutter-bucket the cross piece and a portion of the tongue are deformed into a concave surface with the axis substantially parallel to the tongue.

An object of this invention is to provide a simple and easily manufactured cutter for a ditch cutting apparatus.

Another object of this invention is to provide a new and novel self-sharpening cutter for a ditch cutting apparatus.

Another object of this invention is to provide a combination of ditch cutting elements which includes a new and novel self-sharpening cutter.

Another object of this invention is to provide a method for shaping a new and more efficient cutter for a ditch cutting apparatus.

PREFERRED EMBODIMENT

This invention relates to a combination of a power driven endless chain connected to a power source and attached thereto a plurality of cutter support assemblies with a cutter disposed on each assembly to cut a trench into the earth. In addition, this invention includes the cutter itself and a method of forming the cutter.

Figure 1:
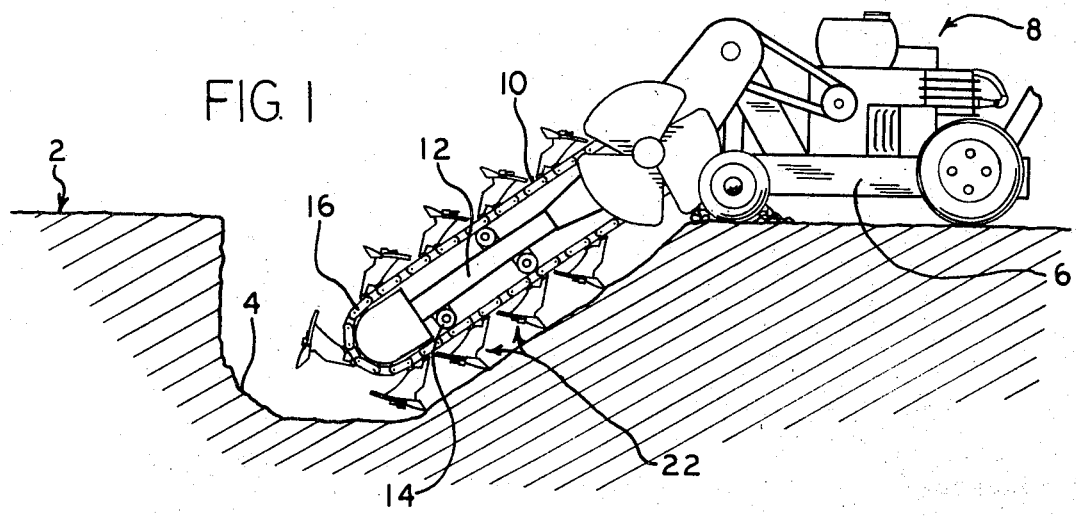
FIG. 1 is a diagrammatic view of a trenching apparatus including a power source and a plurality of cutters.
Figure 2:
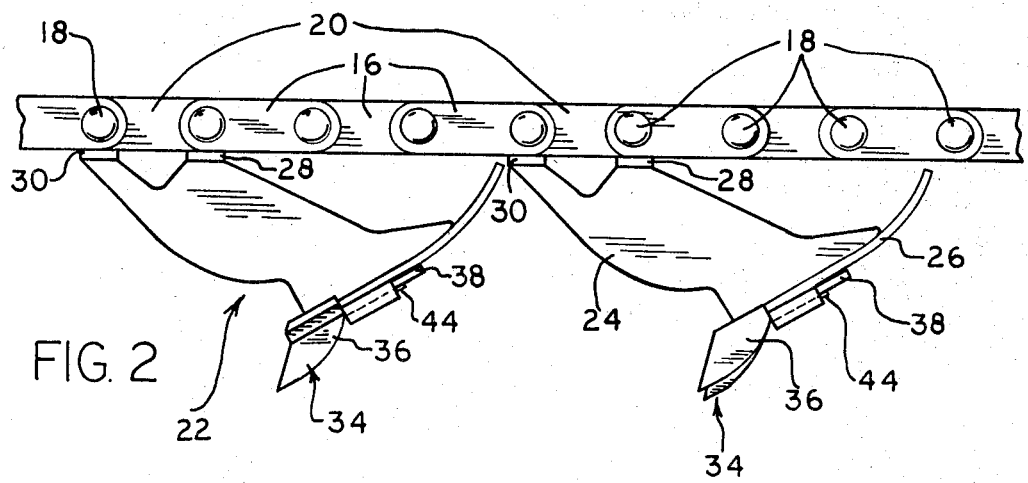
FIG. 2 is an enlarged side view of the endless chain, cutter support assembly and cutter shown in FIG. 1.

FIG. 1 shows the apparatus involved in its usual operating position. The soil surface 2 has been altered by the cutting of a ditch 4 therein. The means for cutting the ditch include a movable frame 6 having assembled thereon a power source 8 which drives an endless digger chain 10. Disposed on a trenching boom 12 are a plurality of sprockets 14 which serve to guide the endless digger chain 10. The chain shown includes a plurality of chain lengths 16 held together by pins 18. Uniformly spaced in the chain 10 are a plurality of mounting links 20 which hold the cutter support assembly 22 in operating position. The cutter support assembly consists of a shank 24 and a shoe 26. The shank 24 is fixed to the mounting link 20 by two legs 28 and 30 and is a one piece supporting structure which projects outwardly from the chain. The shoe 26 is made integral with the shank 24 and is composed of a plurality of pieces which may be welded together. The shoe 26 is disposed at substantially 90° to the plane of the shank 24. Made integral with each shoe 26 is a cutter receiving means or pocket 32. The pocket 32 is formed by a strap welded or otherwise securely attached to the shoe 26. Its function is to grasp a portion of the cutter 34 and to hold the cutter in fixed position for its severing function.

Figure 3:
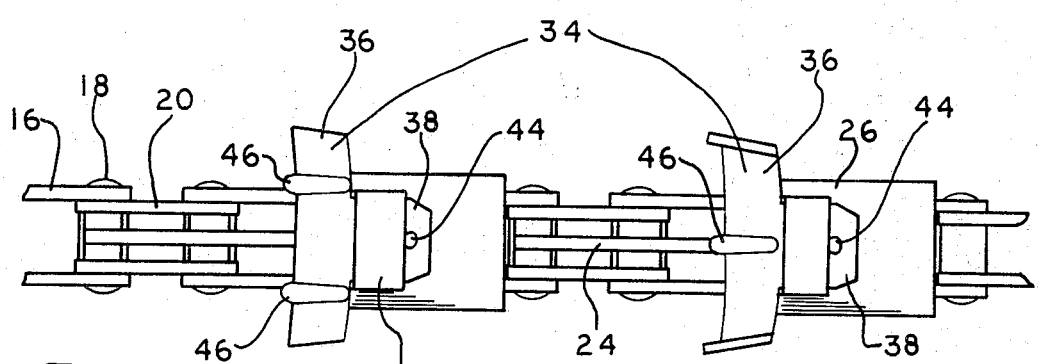
FIG. 3 is a bottom view of the apparatus shown in FIG. 2.

Each of the cutters 34 is of a general T shape including a cross piece or base 36 and a tongue portion 38. Each tongue portion 38 includes a hole 40 which serves as a gripping area for a mounting tool (not shown) to mount the cutters 34 in the appropriate pocket 32. Projecting from one surface of the tongue 38 is a button 44. The mouth of the pocket, measured perpendicular to the surface of the shoe 26 is greater than the thickness of the tongue but slightly less than the combined thickness of the tongue 38 and button 44. The tool forces the button through the mouth of the pocket and the button snaps into place behind the strap, as seen in FIG. 3. Thus, the cutter 34 is mechanically locked in the pocket 32.

In some prior art assemblies the cutter was driven into place by a hammer striking the cutting edge. This obviously dulls the edge and the hole 40 makes this unnecessary.

To disengage the cutter 34 from the pocket 32 requires a greater force than would be ordinarily expected by gravity, for example, one sharp blow with a hammer is adequate to drive the tongue 38 out of the pocket 32. This structure provides for quick and easy assembly and disassembly to reduce any lost time of workmen who may be on the job and who do not work unless the ditching machine operates.

Figure 5:
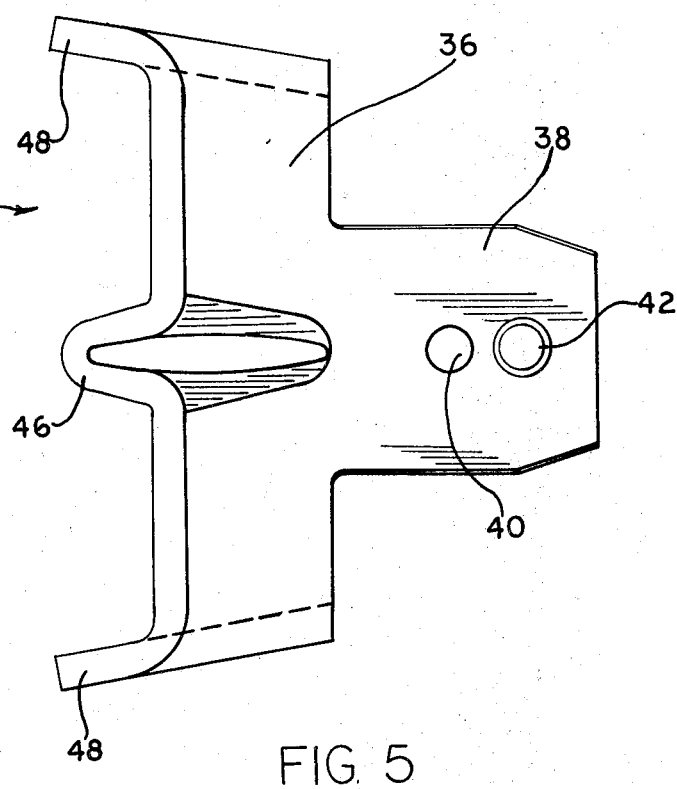
FIG. 5 is a top view of the cutter of FIG. 4.
Figure 6:
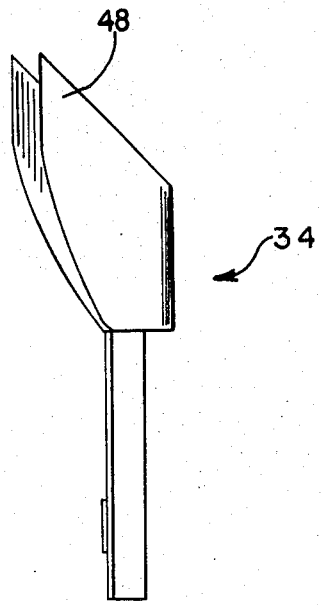
FIG. 6 is a side view of the cutter of FIG. 4.

The cross piece 36 of the cutter 34 may have a plurality of different shapes. Two of the contemplated shapes are illustrated in FIG. 3. One of the cutters has three teeth, the other has two teeth. More detailed drawings of these alternate possibilities are shown in FIGS. 5 and 8.

Each of the cross pieces 36 has at least one V-shaped tooth 46. The cutter shown in FIG. 8 has two V-shaped teeth and the cutter shown in FIG. 5 has one V-shaped tooth and two laterally spaced end teeth 48. The heights of all of the teeth may be of like magnitude as shown in FIGS. 5 and 8 or of diverse heights. Cutters with substantially uniform teeth height have been useful in certain operations. The particular shape of the cutter teeth may be dictated by the particular kind of digging it will do.

Figure 14:
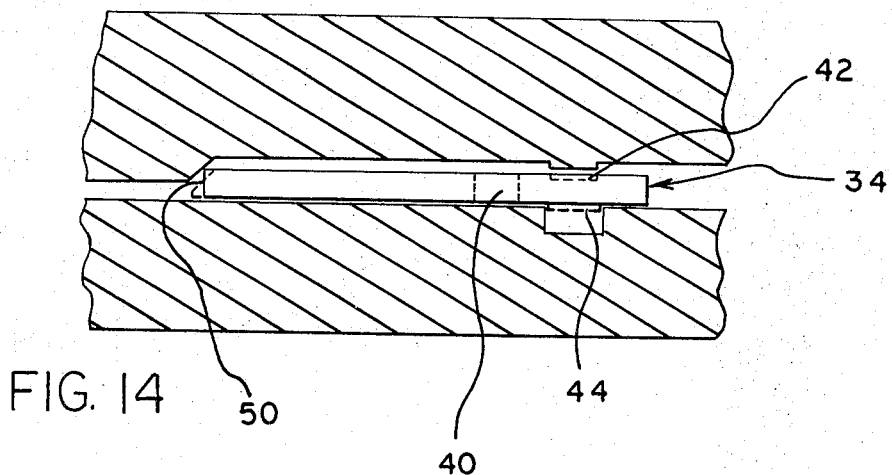
FIG. 14 shows a step of forming the dimple, the retaining button and the forward cutting edge as a single process step.

An important feature of this invention is the sharpened cutting edge 50 on each of the forward surfaces of the cutters 34. The cutting edge is formed by deforming the most forward portion of the cutter 34 or the uppermost part of the T shape, as best seen in FIG. 14. The result is that the cutting edge 50 is on the bottom side of the cutter or on the same side as retaining button 44. As the cutter scrapes against the soil, it will be abraded both on the bottom and the top as soil passes above the edge 50 into the bucket portion of the cutter and below edge 50 as an unsevered mass. As the unsevered, more solid parts of the soil pass beneath the cutting edge 50 and are not picked up on this turn of the chain the harder surface abrades the under side of the cutter. Thus, the bottom surface of the cutting edge 50 is worn away which tends to keep the cutting edge sharp.

Figure 4:
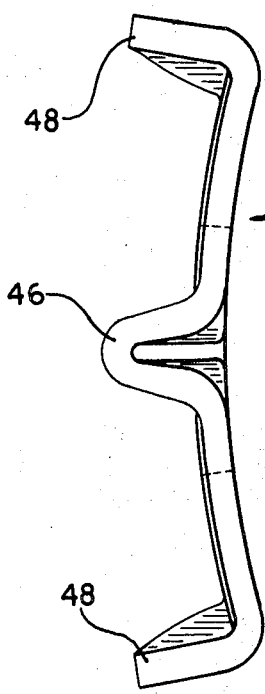
FIG. 4 is an end view of the cutter showing the sharpened cutting edge.
Figures 7, 8:
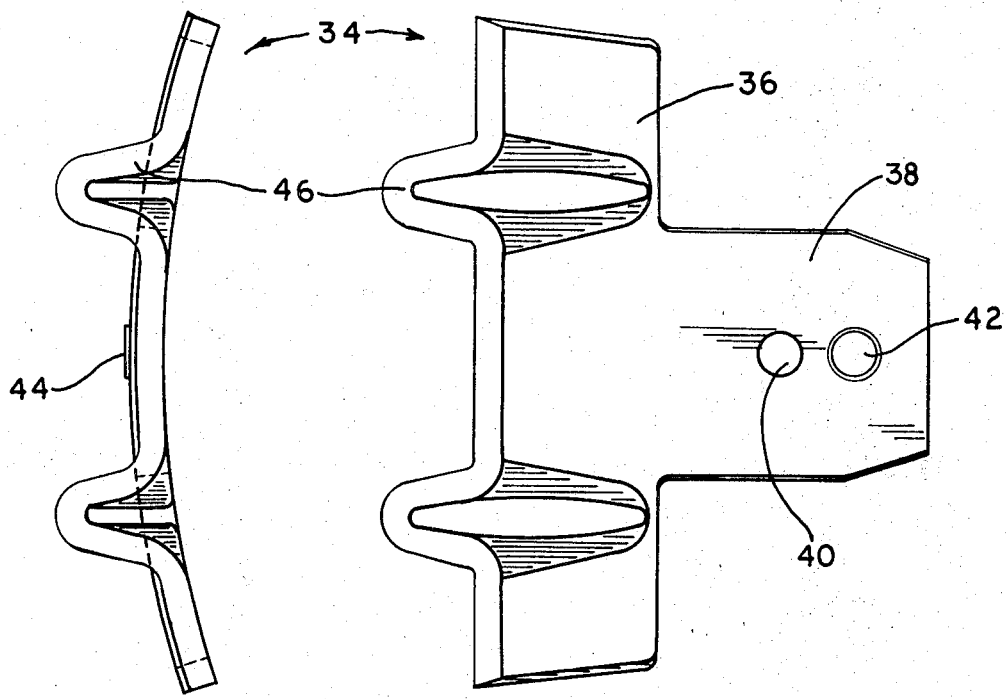
FIG. 7 is an end view of a cutter of modified shape.
FIG. 8 is a top view of the cutter of FIG. 7.
Figure 9:
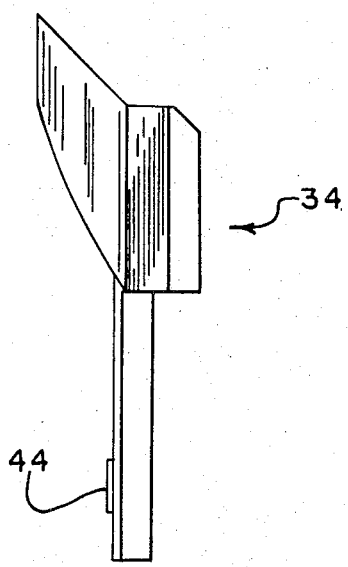
FIG. 9 is a side view of the cutter of FIG. 7.

As best seen in FIGS. 4 and 7, the cutters are slightly deformed to form a concave surface on the opposite side from the extension of the teeth. This deformity provides a cavity which serves as a bucket or scoop for holding the soil excavated by the forward cutting surface 50. The sharpened cutting edge 50 excavates the soil which is dumped into the cavity formed by the concave surface and the soil will be carried to the upper portion of the ditch and deposited there.

Figure 11:
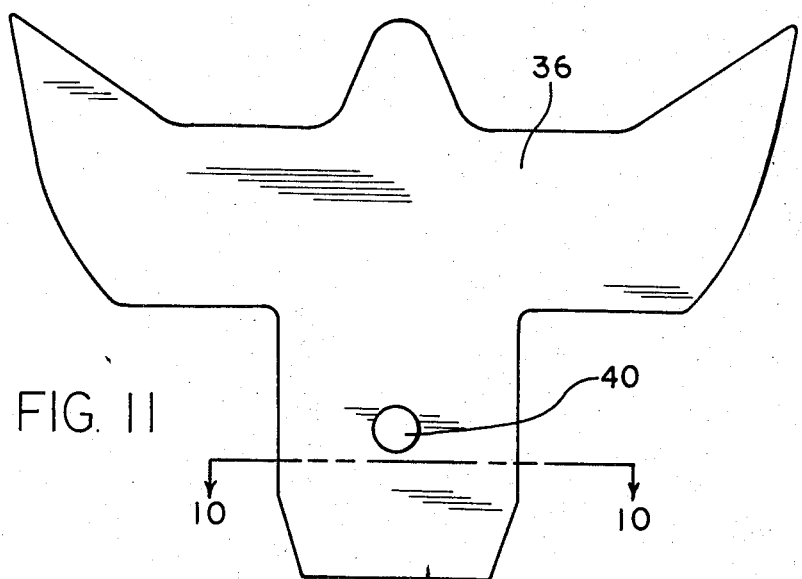
FIG. 11 is a top view of the cutter blank immediately after the hole has been punched.
Figure 10:
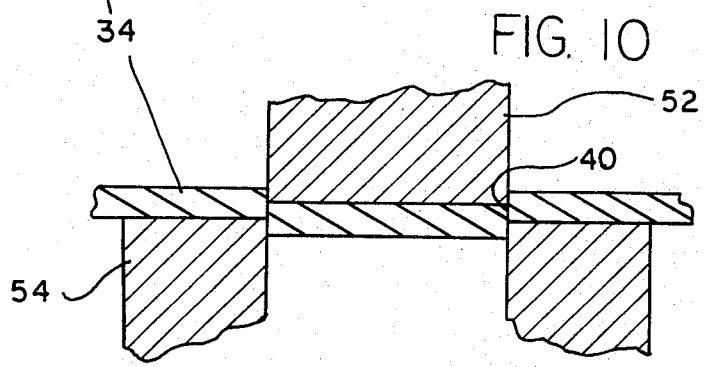
FIG. 10 is an elevational view in section showing a hole being punched in the cutter blank.

Passing now to FIGS. 10 through 14, the method of forming the cutter will be described. FIG. 11 shows the blank used at the start of the forming operation. The blank may be cut from a piece of metal by any particular means convenient or desirable as by shearing or flame cutting. Following the formation of the blank as shown in FIG. 11, the hole 40 is punched by punch 52 and die 54. The next step in the operation is the forming of the cutting edge 50 and a dimple 42 in combination with the retaining button 44. One particular shape of forging die is shown in FIG. 14. All deforming or forging operations are usually performed on the blank after it has been heated to a temperature in the range of about 1200–1600° F. The die of FIG. 14 forms the cutting edge 50 and button 44 in one operation however, they could be formed separately. The cutting edge could be the last deformation to take place if desired.

Figure 12:
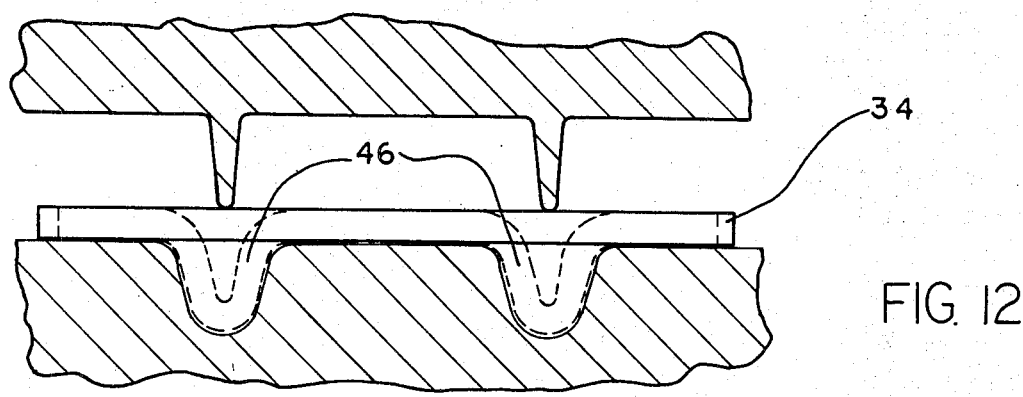
FIG. 12 shows the shape of dies used to form the V-shaped teeth in the cutter.
Figure 13:
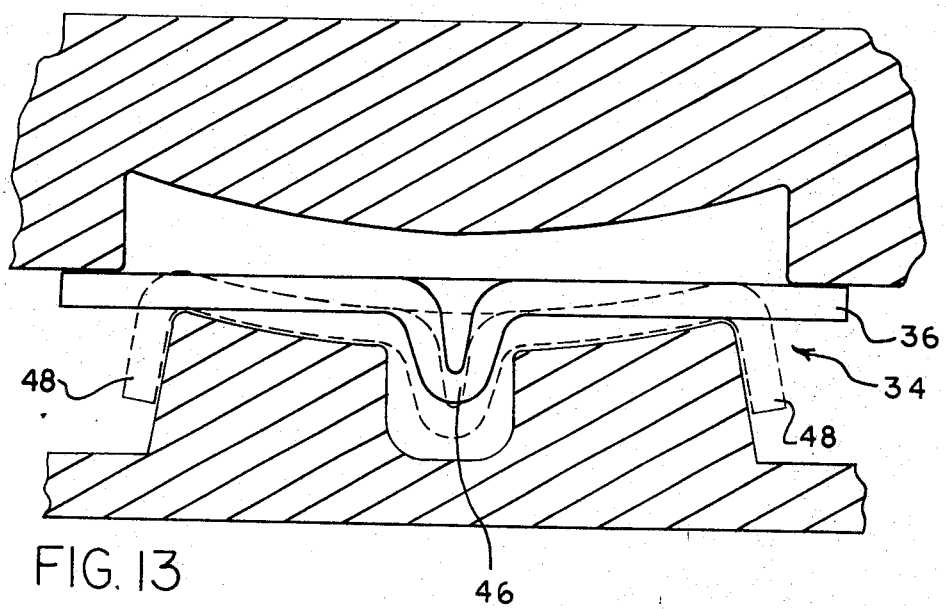
FIG. 13 shows a means for forming the side teeth and the concave shape as a single process step following the formation of the middle V-shaped tooth.

The next step is the formation of the inside teeth 46 of the cutter. The teeth 46 are forged with dies as illustrated in FIG. 12 and terminate at the cutting edge 50. As the teeth recede from the cutting edge 50, the depth of the deformation is less. This is the last step in forming the cutter of FIG. 12 except for the concave surface forming step. This step will be performed with tools as illustrated in FIG. 13 which shows a like process for forming a concave surface on a single V-shaped tooth cutter. FIG. 13 shows the single V-shaped cutter with the two lateral teeth 48 deformed by the same die and at the same time as the concave surface is imparted to the cutter.

The steps in this process have been indicated as following in a certain sequence. However, this sequence is not necessarily the sequence in which the operations are performed. For example, the formation of the sharpened cutting edge 50 could be the last operation performed after the operation shown in FIG. 13, if desirable. This is an optional thing with the manufacturer and no particular sequence of forming steps appears to be preferable over any other and all such sequences are within the concept of this invention.

Various materials may be used for the cutter, among those is C1080 steel which has been found effective. Preferably the C1080 steel is heat treated following the forging to raise the hardness into the range of about Rockwell C 45–50.

Although only two embodiments of the cutter of this invention have been illustrated and described, it is not intended that the illustrated embodiment nor the terms used in the specification to describe them be limiting on the invention. Rather, it is intended that the invention be limited only by the scope of the appended claims.

The invention claimed is:
1. A method of making a cutter for a trench cutting device including the steps of:
 (a) cutting a piece of metal to substantially a T-shape,
 (b) making a hole through the tongue portion of the T,
 (c) forming at least one substantially V-shaped tooth depression in the cross-piece of the T, each depression being elongated and terminating at an edge, the depth of said V decreasing away from the edge,
 (d) forming a sharp cutting surface on said edge,
 (e) bending said cross piece to define a concave surface with its axis substantially parallel to said tongue, and
 (f) deforming a portion of said tongue to form a depression on one side and a button on the opposite side.

2. The method of claim 1 including the step of heating the T-shaped blank to a temperature substantially in the range 1200–1600° F.

3. The method of claim 1 including the step of rolling over the ends of said cross-piece to form a tooth on each end, the height of said end teeth being of like magnitude as said V-shaped tooth.

4. The method of claim 2 wherin the steps of bending said cross piece and rolling over the ends of said cross piece are performed simultaneously.

References Cited
UNITED STATES PATENTS

| | | | |
|---|---|---|---|
| 757,783 | 4/1904 | Skelton | 76—113 |
| 3,312,002 | 4/1967 | Benetti | 37—142 |

BERNARD STICKNEY, Primary Examiner

U.S. Cl. X.R.

37—86, 142, 191; 76—113